Jan. 7, 1936.  J. M. YOUNG  2,026,601
METHOD OF CANNING
Filed Sept. 8, 1930   2 Sheets-Sheet 1

INVENTOR
John M. Young
BY
John C. Carpenter
ATTORNEY

Jan. 7, 1936.　　　　　J. M. YOUNG　　　　　2,026,601
METHOD OF CANNING
Filed Sept. 8, 1930　　　2 Sheets-Sheet 2

INVENTOR
John M. Young
BY
John C. Carpenter
ATTORNEY

Patented Jan. 7, 1936

2,026,601

UNITED STATES PATENT OFFICE 2,026,601

METHOD OF CANNING

John M. Young, Brooklyn, N. Y., assignor to American Can Company, New York, N. Y., a corporation of New Jersey Application September 8, 1930, Serial No. 480,595

6 Claims. (Cl. 226—116)

The present invention relates to a method of vacuum canning and has particular reference to the protection of the container used for the product being canned, during high vacuumization of the same.

The use of a relatively high vacuum such as twenty-seven inches and more, has been found to give highly beneficial canning results, particularly with some products of a cellular nature, such as fresh fruits, these results not being obtainable without vacuum or with only low vacuum. Commercial canning with high vacuum, using the most satisfactory type of container for the product, the ordinary tin can, has certain inherent difficulties which the present invention overcomes. For speed of production and ease of operation, it is desirable to vacuumize only the interior of the can, but where its exterior is subjected to atmospheric pressure during vacuumizing, the walls of the cans, particularly of the larger sizes, sometimes fail and the cans partially or fully collapse.

The present invention contemplates protecting all or a part of the exterior can walls during vacuumizing so that the pressure of the surrounding atmosphere cannot press against the walls and crush or distort the container. The method contemplates certain steps of procedure which may be used with any of the regular canning operations, the step of syruping a container filled with a cellular product being selected as one adaptation of the invention to canning.

The principal object of the present invention, is the provision of an improved method of protecting the containers from the destructive influence of exterior atmospheric pressure during high vacuumization of their interiors without enclosing them in a vacuum chamber and without subjecting their exterior walls to vacuum.

A further important object of the invention is the provision of a method of canning under high vacuum wherein the exterior walls of the containers being vacuumized are protected against the crushing action of the surrounding atmosphere and wherein certain of the interior walls thereof adjacent their open ends are interiorly supported to prevent collapse during vacuumizing.

An important object of the invention is the provision of a method of canning a cellular product in a container by protecting the exterior of the container against atmospheric destruction during high vacuumization of its interior and of the included product, whereby air is extracted from the cells of the product and whereby the shape and condition of the container is unaffected.

An important object of the invention is the provision of a method of canning a cellular product and a liquid in a container by protecting the exterior of the container against atmospheric destruction during high vacuumization of its interior and of its contents, whereby air is extracted from the cells of the product and replaced by the liquid and whereby the shape and condition of the container is unaltered.

Numerous other objects of the invention will be apparent at it is better understood from the following description, which, taken in connection with the accompanying drawings, discloses a preferred embodiment thereof.

Referring to the drawings.

Figure 1:
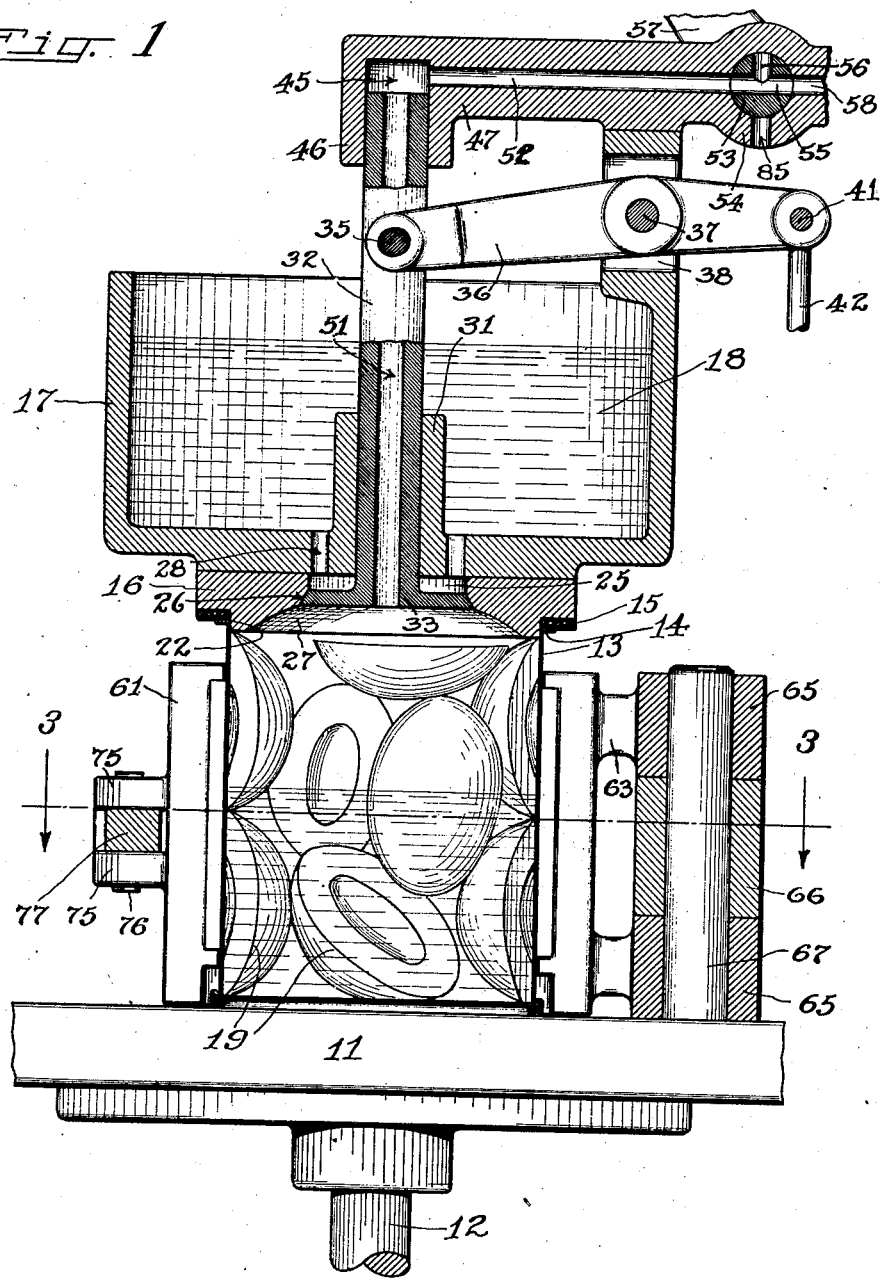
Figure 1 is a vertical sectional view, largely schematic, of the principal elements of an apparatus adaptable to carrying out steps in the present invention, the view being taken along a central line indicated as 1—1 in Fig. 3.

The present invention, being for a method of protecting a container during certain canning operations, is herein exemplified in connection with an apparatus capable of carrying out some canning operations to which steps of the invention may be adapted. For this purpose there is disclosed elements of a syruping device combined with means for vacuumizing the interior of the container.

Such an apparatus comprises a baseplate 11 carried on the upper end of a stem 12 by means of which the baseplate is raised and lowered. A container 13, which may preferably be the ordinary tin can, is provided for the product to be canned and after filling the product into the can, the latter is placed upon the baseplate 11. The plate and its superimposed can are then lifted until an upper flange 14 of the latter is brought into sealing egagement with a gasket ring 15 preferably of rubber or other similar resilient material, carried in a vacuum head 16.

The head 16 is secured to the bottom of a tank or vessel 17 adapted to hold a liquid 18. This tank constitutes a part of a syruping apparatus, the liquid 18 being the syrup which is later put into the can with its more solid contents, in the present case this contents being a cellular product 19 such as fruit.

In the canning of some products it is sometimes advisable to partially fill the can with syrup before it is vacuumized and in Fig. 1 such partial filling is illustrated. The reason for such a procedure is to prevent spilling or boiling over of the liquid in the can when the vacuum is being applied to the can's interior. The can, with its cellular product but without any syrup, may first be vacuumized and later syruped, but this takes a little longer.

The head 16 is provided with a circular projection 22 which extends below the lower surface of the gasket 15 and is of a proper size to loosely fit within the open end of the container as it is brought into sealing contact on the gasket 15 by raising of the plunger 11. This supports the relatively fragile open end of the can when it is vacuumized.

The head 16 is provided with a central opening 25, the surrounding walls of which are shaped to provide a valve seat 26, the opening 25 communicating, at its lower end and through the valve opening, with a chamber 27, in turn communicating with the interior of the can 13. Vertical openings 28 cut through the floor of the tank 17 form communicating passageways for the syrup in its flow from the tank and into the can.

An apertured boss 31 extends upwardly from the bottom of the tank 17 and provides a bearing for a vertically sliding valve stem 32 enlarged at its lower end into a valve head 33 which cooperates with the valve seat 26 when in raised position to shut off communication between the openings 25 and 27. The upper end of the stem 32 is loosely connected at 35 to one end of a lever 36 pivoted on a shaft 37 carried by a bracket 38 extending upwardly from one of the walls of the tank 17. The opposite end of the lever 36 is pivotally connected at 41 to an actuating rod 42 which is raised and lowered in proper time to open and close the valve 33.

The upper end of the valve stem 32 extends into and has sliding movement within a channel 45 formed interiorly of a boss 46 which is integral with a longitudinally extending frame 47 mounted on and carried by the bracket 38. A vertically extending passageway 51 through the valve stem 32 communicates at its lower end with the opening 27 in the head 16 and at its upper end with the channel 45. A horizontal passageway 52 is formed interiorly of the frame 47 and communicates at one end with the channel 45 and at the other end with a three-way valve 53 located in a valve seat 54 formed in the frame 47.

The valve 53 is provided with a passageway 55 which extends along its diameter and connects with a radially extending passageway 56. The valve 53 is adapted to be moved into one of its three positions by an operating handle 57. In the position illustrated in the drawings, the passageway 55 forms a communication between one end of the passageway 52 and a passageway 58 leading from any suitable source of vacuum supply.

The exterior walls of the can 13 are fully or partially enclosed by a device which blocks off and protects them from atmospheric pressure during vacuumizing of the interior of the can. The preferred form of protecting device, as illustrated in the drawings, comprising a pair of semicircular jaws 61, 62 provided with arms 63, 64 communicating with pintle lugs 65, 66 which movably connect with a vertical stem 67 carried by the baseplate 11. This construction permits hinging movement of the jaws. These jaws 61, 62 are provided with resilient faces which may be formed by semi-circular rings 71, 72 formed of rubber or other resilient material. These members 71, 72 are adapted to tightly engage and partially or fully enclose the can when the jaws 61, 62 are brought together in the position illustrated in Figs. 1 and 3.

Figure 3:
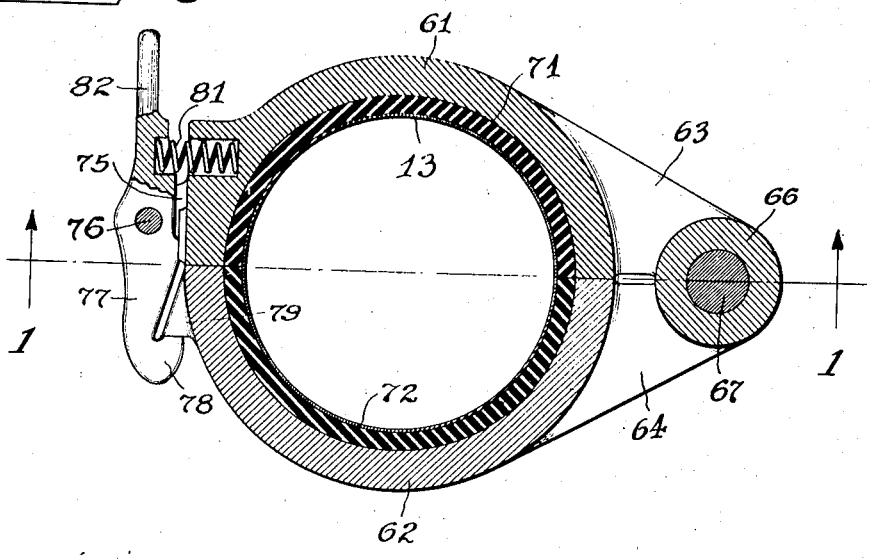
Fig. 3 is a plan sectional view taken substantially along the line 3—3 in Fig. 1.

Provision is made for holding the jaws in locked position, the jaw 61 being formed with lugs 75 which carry a pintle pin 76 on which a catch member 77 oscillates. This catch member is provided with a hooked end 78 which engages a projection 79 carried by the jaw 62 and when in engaged position forms a rigid clamp for the jaws as illustrated in Fig. 3. A spring 81 is interposed between a wall of the jaw 61 and the catch member 77 and normally holds the latter in locked position, a finger trigger 82 formed on the end of the catch being provided for releasing the jaws from this locked position when desired.

With the can 13, filled with its cellular product 19, in place on the baseplate 11 with its cylindrical wall partially or fully enclosed by the jaws 61, 62, its upper flanged end in sealing contact with the head 16 (as illustrated in Fig. 1), it is ready for the vacuumizing operation. The handle 57 of the three-way valve 53 is thereupon operated to connect the passageway 52 with the source of vacuum 58 by means of the passageway 55 in the valve, this being the position shown in Fig. 1. Air is immediately withdrawn from the interior of the can through the passageways 51, 52, 55 and 58 and a high vacuum established in the interior of the container.

The can 13 is not in a vacuum chamber but its exterior walls are protected against the action of the outside atmospheric pressure by the enclosing walls 61, 62. In the drawings the effective clamping area of these jaws is illustrated as extending only throughout a part of the height of the can wall and parts of the exterior of the can above and below are exposed to atmosphere.

In most cases it is not necessary to enclose the entire can wall but this may be altered at will by increasing or decreasing the height of the sealing rings 71, 72, thus adapting the clamping apparatus to the requirements of the can being vacuumized.

After the interior of the container has thus been exhausted of air and is in a highly vacuumized condition, the valve 53 may be shifted to cut off communication between the passageways 52 and 58 and the passageway 56 may then be brought into communication with the end of the passageway 52. The passageway 55 thereupon extends in a vertical position and one end thereof connects with a passageway 85 formed in the valve member 54 and passing to the outside of the valve casing. Air from the exterior atmosphere then enters the passageways 85, 55, 56, 52 and 51 and breaks the vacuum on the interior of the can 13. The time when this breaking of the vacuum takes place will vary with the canning procedure used and examples of two different procedures will now be given to illustrate this feature of the invention.

Figure 2:
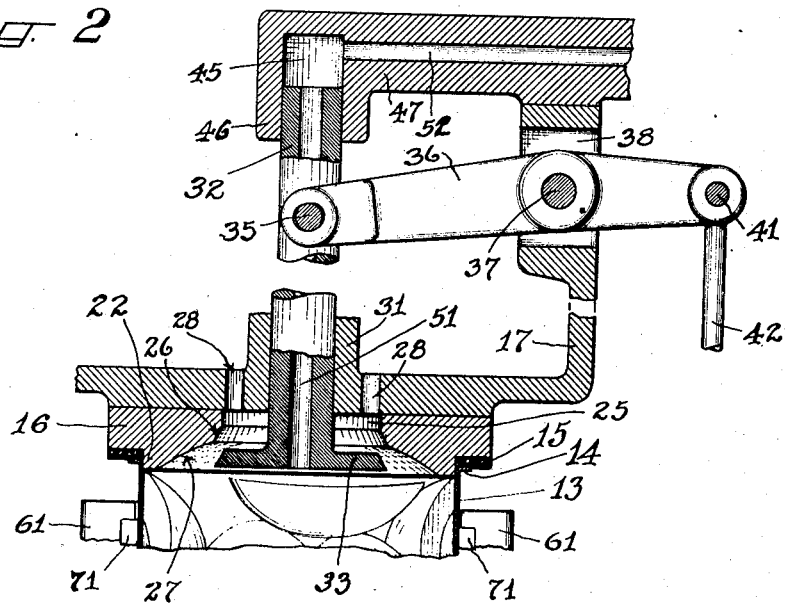
Fig. 2 is a fragmentary showing of parts of the apparatus as disclosed in Fig. 1, but in a different position.

In some cases, particularly where the can is partially filled with syrup, further syrup 18 from the vessel 17 may be introduced into the can prior to breaking the vacuum. In this event the operating rod 42 may be actuated prior to movement of the valve 53 and, while the interior of the can is still in connection with the source of vacuum, the valve 33 is lowered by movement of the lever 35 and this action moves the valve from its seat 26 and places it into the position illustrated in Fig. 2. Liquid thereupon flows through the openings 28, 25, around the valve and through the chamber 27 into the can. As soon as the liquid has filled the can, the valve 53 is then operated as previously described and the interior of the can is connected with atmosphere.

In some cases it may be desirable to first cut off the source of vacuum from the can and also cut off all communication with the passageway 52. With a dead vacuum then on the interior of the can the valve 33 is opened and syrup or other liquid 18 is permitted to flow as before from the tank and into the can. When the can is filled with syrup to the proper amount, the valve 33 is closed and the valve 53 is then moved to admit air to the can.

A third procedure has already been described above, that is, where the can is vacuumized, then air admitted after which the syrup is introduced into the can from the tank 17.

Whatever the exact procedure, when the operation of vacuumizing and syruping has been completed and the can is ready to be removed from the head 16, its interior must be in communication with outside atmosphere. Lowering of the baseplate 11, which follows, then carries the can with it and withdraws it from the head 16.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

I claim:

1. The method of canning and protecting open-end containers against collapse while under high vacuum, which comprises partially covering and holding against outward movement the greater part of the outside cylindrical part of the container to prevent atmospheric pressure from coming in contact with the enveloped part thereof while supporting its interior wall adjacent its open end.

2. The method of canning, which consists in filling an open-end container with a cellular product, partially covering the exterior cylindrical part thereof to prevent atmospheric pressure from coming in contact with the enveloped part, connecting only the interior of the container with a source of high vacuum, and supporting a part of the interior wall of the container adjacent its open end.

3. The method of canning and protecting containers against collapse while under high vacuum, which comprises partially filling the container and then enclosing a substantial portion of the outer side walls of the container within a rigid covering having a resilient packing, to prevent atmospheric pressure from coming in contact with the enclosed wall portion thereof.

4. The method of canning, which consists in filling a container with a product, enclosing a substantial vertical area of the outer cylindrical wall of the open container within a rigid covering provided with a resilient packing contacting with and extending substantially completely around the enclosed portion of the container wall, to exclude atmospheric pressure from the enclosed wall portion so as to insure against collapse of the container while under vacuum, vacuumizing the interior of the container to remove occluded air and gas from the product, and then filling the vacuumized space in the container with a liquid.

5. The method of canning, which consists in partially filling a container with solid and liquid contents, subjecting the interior thereof and its contents to a high vacuum while enclosing a substantial part of the side walls of the container along its vertical dimensions within a rigid covering having a resilient packing in close contact with the enclosed wall portions, to exclude atmospheric pressure from the enclosed wall part of the container, and then adding more liquid to the container prior to exposing its interior to atmosphere.

6. The method of canning, which comprises completely enclosing a substantial portion of the outer cylindrical wall of a container filled with a cellular product within a rigid covering having a resilient packing in close contact with said exterior wall portion to prevent access of atmospheric pressure thereto, connecting only the interior of the container with a source of high vacuum, shutting off communication with the source of vacuum, introducing a liquid into the container and surrounding the cellular product, and thence subjecting the interior of the filled container to atmosphere.

JOHN M. YOUNG.